United States Patent
De Smet et al.

(10) Patent No.: US 10,040,454 B2
(45) Date of Patent: Aug. 7, 2018

(54) LNT CONTROL WITH ADAPTIVE CRUISE CONTROL

(71) Applicant: Ford Global Technologies, LLC, Dearborn, MI (US)

(72) Inventors: Frederik De Smet, Genk (BE); Jan Harmsen, Simpelveld (NL)

(73) Assignee: Ford Global Technologies, LLC, Dearborn, MI (US)

(*) Notice: Subject to any disclaimer, the term of this patent is extended or adjusted under 35 U.S.C. 154(b) by 43 days.

(21) Appl. No.: 15/215,347

(22) Filed: Jul. 20, 2016

(65) Prior Publication Data

US 2017/0021831 A1 Jan. 26, 2017

(30) Foreign Application Priority Data

Jul. 23, 2015 (DE) .................. 102015213892 U

(51) Int. Cl.
| | |
|---|---|
| *F01N 3/00* | (2006.01) |
| *B60W 30/16* | (2012.01) |
| *B60K 31/00* | (2006.01) |
| *F01N 3/08* | (2006.01) |
| *F01N 9/00* | (2006.01) |

(Continued)

(52) U.S. Cl.
CPC ............ *B60W 30/16* (2013.01); *B60K 31/00* (2013.01); *F01N 3/0814* (2013.01); *F01N 3/0842* (2013.01); *F01N 3/0871* (2013.01); *F01N 9/00* (2013.01); *F02D 41/0275* (2013.01); *F01N 2900/10* (2013.01); *F01N 2900/12* (2013.01); *F01N 2900/1602* (2013.01); *F02D 41/10* (2013.01); *F02D 2200/70* (2013.01); *Y02T 10/47* (2013.01)

(58) Field of Classification Search
USPC .......... 60/274, 276, 285, 286, 295, 297, 301
See application file for complete search history.

(56) References Cited

U.S. PATENT DOCUMENTS

| | | | |
|---|---|---|---|
| 6,560,960 B2 * | 5/2003 | Nishimura | ............ F01N 3/0842 |
| | | | 123/399 |
| 6,708,483 B1 * | 3/2004 | Robichaux | ............ F01N 3/0807 |
| | | | 123/436 |
| 6,758,185 B2 | 7/2004 | Surnilla et al. | |

(Continued)

FOREIGN PATENT DOCUMENTS

| | | |
|---|---|---|
| DE | 102007027182 A1 | 12/2008 |
| JP | 2010265771 A | 11/2010 |

OTHER PUBLICATIONS

Basshuysen, Richard van, et al., "Handbuch Verbrennungsmotor," 2010, pp. 819-828, Partial Translation of p. 823, "Treatment of Exhaust Gases in Internal Combustion Engines," 20 Pages.

*Primary Examiner* — Binh Q Tran
(74) *Attorney, Agent, or Firm* — Julia Voutyras; McCoy Russell LLP

(57) ABSTRACT

A method is provided for controlling a NOx storage catalytic converter that is disposed in the exhaust system of an internal combustion engine of a motor vehicle with an adaptive cruise control system, wherein regeneration of the NOx storage catalytic converter is started depending on the distance to a vehicle ahead. For this the motor vehicle is accelerated in a rich mode for regeneration if the distance to the vehicle ahead is large enough so that the regeneration will be completed during an acceleration phase in which the distance is reduced.

18 Claims, 3 Drawing Sheets

(51) Int. Cl.
*F02D 41/02* (2006.01)
*F02D 41/10* (2006.01)

(56) References Cited

U.S. PATENT DOCUMENTS

| | | | |
|---|---|---|---|
| 7,845,165 B2* | 12/2010 | Satou | B01D 53/944 |
| | | | 60/295 |
| 7,878,175 B2 | 2/2011 | Livshiz et al. | |
| 8,086,392 B2 | 12/2011 | Anilovich et al. | |
| 8,381,521 B2* | 2/2013 | Schaffeld | F02D 41/0007 |
| | | | 123/559.1 |
| 2004/0244368 A1* | 12/2004 | Yang | F02D 41/0235 |
| | | | 60/299 |
| 2005/0016163 A1* | 1/2005 | Kitahara | F01N 3/0842 |
| | | | 60/285 |
| 2007/0137183 A1* | 6/2007 | Kawamura | F01N 3/18 |
| | | | 60/286 |
| 2011/0202253 A1 | 8/2011 | Perry et al. | |
| 2014/0277996 A1 | 9/2014 | Pierik et al. | |

\* cited by examiner

LNT CONTROL WITH ADAPTIVE CRUISE CONTROL

CROSS-REFERENCE TO RELATED APPLICATION

This application claims priority to German Patent Application No. 102015213892.5, filed Jul. 23, 2015, the entire contents of which are hereby incorporated by reference for all purposes.

FIELD

The disclosure is directed to a method for the control of a NOx storage catalytic converter that is disposed in the exhaust system of an internal combustion engine of a motor vehicle.

BACKGROUND/SUMMARY

With internal combustion engines, a catalytic aftertreatment of the exhaust gases has become established to comply with the legally prescribed emission values. Modern internal combustion engines often operate with lean fuel-air mixtures, e.g., with an excess of oxygen, in order to increase efficiency. Oxides of nitrogen that occur cannot be reduced in the lean mode with CO or HC, because the catalytic reduction thereof in the NOx storage catalytic converter is only possible in a rich mode. Therefore, in the lean mode the oxides of nitrogen in the exhaust gas are temporarily stored in a NOx storage catalytic converter, also referred to as a lean NOx trap (LNT). If the absorption capacity of the LNT is exhausted, a cycle is carried out for the regeneration of the LNT with a rich exhaust gas mixture or in a substoichiometric mode ($\lambda<1$). Such a regeneration is also referred to as a rich purge. In this cycle, the temporarily stored oxides of nitrogen are reduced to nitrogen and the catalytic converter is again ready for the storage of oxides of nitrogen.

It is often problematic, however, to maintain the rich purge for long enough so that the regeneration of a LNT can be fully carried out. Gas exchange and gear changing by a driver make the control of the regeneration difficult. This particularly applies to a dynamic manner of driving with frequent operation of the accelerator pedal. It is usual to start a regeneration of a LNT at a low acceleration, whereby a uniform increase of the target torque is possible for a small amount of additional re-injection of fuel. On the other hand, an aggressive manner of driving is unfavorable, because the torque cannot be maintained for long enough before the next gear is engaged. Even at low acceleration, however, an interruption of the regeneration can occur, for example if a change is made into a braking phase. This means that a new regeneration has to be started in order to reduce the oxides of nitrogen completely, which has an adverse effect on the fuel consumption.

The inventors herein have recognized the above issues and provide a method to at least partly address the issues. In one example, a method includes, responsive to a first condition: detecting a first speed of the motor vehicle; activating the adaptive cruise control system and setting the adaptive cruise control system to a second speed and detecting a distance to a preceding vehicle; increasing the distance to the preceding vehicle if the distance is less than a target distance; starting an acceleration phase while simultaneously starting regeneration of the NOx storage catalytic converter if the distance to the preceding vehicle is greater than the target distance and the first speed of the vehicle is less than the second speed; and maintaining the acceleration phase until a target speed is reached, a gradient of the acceleration of the motor vehicle controlled such that the regeneration of the NOx storage catalytic converter is completed in the acceleration phase.

In this way, adaptive cruise control is used advantageously in order to control the distance to a preceding vehicle ahead of the motor vehicle in which the LNT regeneration is carried out. During operation with adaptive cruise control, the speed of the motor vehicle is reduced, if a vehicle ahead has been identified, in order to achieve or maintain a predetermined distance, e.g., a target value of the distance. If the target value of the distance is reached or exceeded, the motor vehicle is accelerated until the target value of the speed is reached. LNT regeneration may then be carried out during this controlled acceleration. Owing to the method, the regeneration of a NOx storage catalytic converter can be controlled advantageously without being interrupted by an irregular manner of driving or aggressive acceleration. Owing to the full regeneration of the NOx storage catalytic converter, it is again ready to receive oxides of nitrogen from the exhaust gas. At the same time, the fuel consumption is reduced by the uninterrupted regeneration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
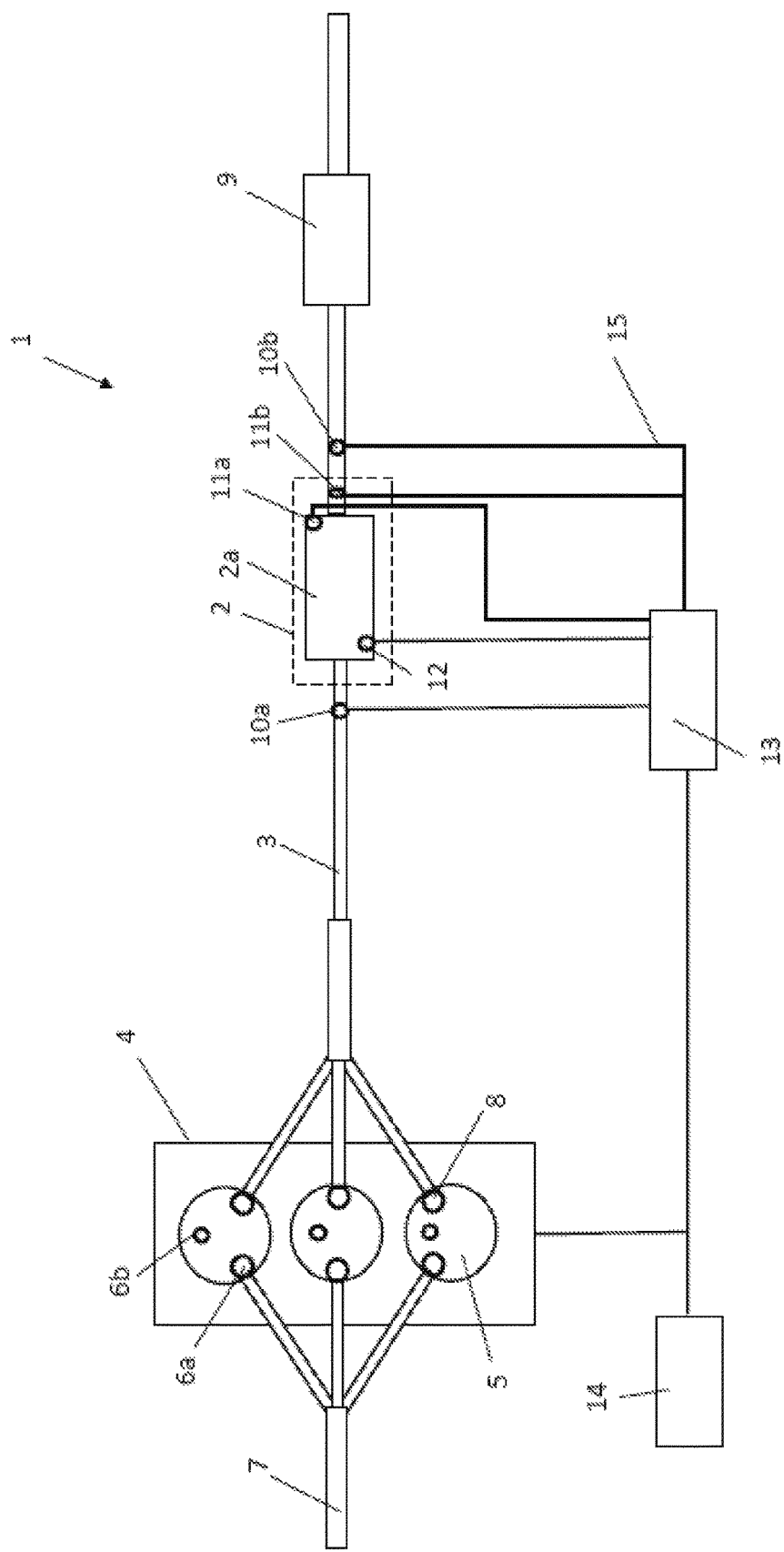
FIG. 1 schematically shows an example engine system.

In the present description, the term "motor vehicle" exclusively denotes the motor vehicle with the adaptive control system with which the method is performed, to distinguish the same from vehicles ahead and oncoming vehicles. The term "vehicles" is used for other vehicles, in particular vehicles ahead and oncoming vehicles, since the same can also be horses and carts, cyclists, and the like besides motor vehicles.

The target value of the distance refers to a distance at which an acceleration of a motor vehicle can be carried out until reaching a permissible distance to a vehicle ahead or for performing an overtaking maneuver on the vehicle by the motor vehicle and the NOx storage catalytic converter can be fully regenerated during the acceleration phase. The target value of the speed refers to a speed that is set by a controller and that is to be reached and not exceeded.

The method according to the disclosure, wherein vehicle acceleration during adaptive cruise control is controlled to allow full LNT regeneration, may be started depending on the oxides of nitrogen content of the NOx storage catalytic converter, for example if the oxides of nitrogen content has reached a threshold value. The oxides of nitrogen content may be directly measured and also may be based on a modelled calculation. The method may also be started if a certain concentration of oxides of nitrogen is measured downstream of the NOx storage catalytic converter that indicates that the storage capacity of the NOx storage catalytic converter is exhausted. The threshold value relates to a state of the NOx storage catalytic converter in which a quantity of oxides of nitrogen has been stored that makes a regeneration of the NOx storage catalytic converter necessary.

The method according to the disclosure may be additionally started depending on the temperature of the NOx storage catalytic converter if the temperature lies above a first threshold value and below a second threshold value. The temperature may be directly measured and also may be based on a modelled calculation. It may be advantageous to achieve a certain temperature in order to more effectively catalyze the conversion of the oxides of nitrogen and the production of ammonia. Excessively high temperatures may degrade the catalytic converter, however.

Furthermore, the method may be additionally started depending on current and/or averaged parameter values, wherein the parameters are selected from the group comprising the speed of the motor vehicle, the revolution rate of the internal combustion engine, the loading, the type and amount of the fuel, the accelerator pedal position and the brake signals. For this the parameters can correspond to current values or can have been evaluated over a certain period of time, for example by averaging or other statistical methods.

For this an increase in the temperature of the NOx storage catalytic converter may be initiated depending on the current and/or averaged parameter values and a probability based on a driver profile that an acceleration phase will be started in a next predetermined time frame and that the acceleration phase will last for a time that is necessary for the regeneration. It is known to the person skilled in the art how the temperature in the NOx storage catalytic converter can be increased.

Furthermore, the method according to the disclosure may be additionally started depending on information of a navigation system relating to a pre-programmed route to be travelled and/or on current information about the route to be travelled. The information for this may also originate from other satellite-based communications or telephonic information besides from a navigation system.

The method according to the disclosure may be additionally started depending on information about a speed difference between the motor vehicle and the vehicle ahead.

The method according to the disclosure may be additionally started depending on information about oncoming vehicles. This enables the method to be started if the acceleration includes an overtaking maneuver on the vehicle ahead and no oncoming traffic is to be expected in the period of time calculated for this.

Furthermore, the method according to the disclosure may be additionally started depending on car-to-car communications in relation to upcoming acceleration or braking events of the vehicle ahead. This enables the method to be started if no planned braking event of the vehicle ahead will disturb the acceleration of the motor vehicle.

Furthermore, during execution of the method according to the disclosure, there may be no change of gear during an ongoing acceleration phase. The advantage is that the engagement of a higher gear would interrupt the rich purge; the regeneration would thus remain incomplete. For motor vehicles with automatic shifting, the shifting is ideally set up such that the gear will be retained while the regeneration in the rich mode is not completed.

The fuel injection for the regeneration may be controlled depending on a calculated period of time that is required for the regeneration. The amount of the fuel injection depends here on the planned or modelled time that is estimated for the acceleration phase as well as on the targeted lambda values and the targeted reduction in oxides of nitrogen.

In an arrangement 1 corresponding to the representation of FIG. 1, an exhaust gas aftertreatment system 2 with a NOx storage catalytic converter 2a is disposed in an exhaust system 3 of an internal combustion engine 4. The internal combustion engine comprises by way of example three cylinders 5, but can also comprise a different number of cylinders, for example two, three, four, five, six, eight, ten or twelve. Air or a mixture of induction air and fuel can be sucked into the cylinder from an induction system 7 through inlet valves 6a. The fuel can also be injected into the cylinders directly by means of injection nozzles 6b. The exhaust gas that occurs is discharged via exhaust valves 8 by means of the exhaust system 3. The direction of flow of the exhaust gas is characterized by the arrow.

The NOx storage catalytic converter 2a is disposed in an exhaust gas aftertreatment system 2, in which further catalytic converters can be disposed, for example depending on the internal combustion engine a three-way catalytic converter, an oxidation catalytic converter, and/or a diesel particle filter. A catalytic converter for selective catalytic reduction 9 in which oxides of nitrogen, for example those that have been stored in the NOx storage catalytic converter 2a, can be reduced is disposed downstream of the exhaust gas aftertreatment system 2 in the exhaust system 3.

A first oxygen sensor 10a that measures the oxygen content of the exhaust gas flow before the exhaust gas aftertreatment system 2, in particular the NOx storage catalytic converter 2a, is disposed upstream of the exhaust gas aftertreatment system 2 in the exhaust system 3. A second oxygen sensor 10b that measures the oxygen content of the exhaust gas flow after the exhaust gas aftertreatment system 2, in particular the NOx storage catalytic converter 2a, is disposed downstream of the exhaust gas aftertreatment system 2 in the exhaust system 3. Further oxygen sensors can be disposed in the exhaust gas aftertreatment system 2 and in the exhaust system 3.

A first oxides of nitrogen sensor 11a that measures the oxides of nitrogen content in the NOx storage catalytic converter 2a is disposed in the NOx storage catalytic converter 2a. A second oxides of nitrogen sensor 11b that measures the oxides of nitrogen content of the exhaust gas flow after the exhaust gas aftertreatment system 2, in particular the NOx storage catalytic converter 2a, is disposed downstream of the NOx storage catalytic converter 2a. Further oxides of nitrogen sensors can be disposed in the exhaust gas aftertreatment system 2 and in the exhaust system 3.

A temperature sensor 12 that measures the temperature of the NOx storage catalytic converter 2a is disposed in the NOx storage catalytic converter 2a. Further temperature sensors can be disposed in the NOx storage catalytic converter 2a, at other points in the exhaust gas aftertreatment system 2 and in the exhaust system.

The oxygen sensors, oxides of nitrogen sensors and temperature sensors are connected to a control device 13 that receives and processes the values. The control device 13 is further connected to the internal combustion engine 4 and an adaptive cruise control system 14. The sensors, control device 13 and adaptive cruise control system 14 are connected to each other by a line 15.

The control device and/or adaptive cruise control system may receive signals from the various sensors of FIG. 1 (such as the NOx and temperature sensors) and employ the various actuators of FIG. 1 (such as the injection nozzles) to adjust engine operation based on the received signals and instructions stored on a memory of the control device and/or adaptive cruise control system. For example, as described in more detail below, adjusting a speed of the vehicle may include adjusting (e.g., increasing or decreasing) an amount of fuel injected by the injection nozzles. While the control device and adaptive cruise control system are described herein as separate components, the control device and adaptive cruise control system may be operatively and communicatively coupled and in some examples may be included in a single device.

In one embodiment of a method for the regeneration of the NOx storage catalytic converter 2a, the speed of the motor vehicle is detected. The detection of the speed of the motor vehicle is carried out with a suitable sensor. The distance to a vehicle ahead is detected. The adaptive cruise control system 14 is used to detect the distance to the vehicle ahead, which also controls the distance to a vehicle ahead in addition to a speed to be achieved. The position and the speed of the vehicle ahead are determined by a sensor, for example a radar sensor. A target value for the speed of the vehicle and a target value for the distance between the motor vehicle and the vehicle ahead are predetermined, at which an acceleration phase and thus regeneration of the NOx storage catalytic converter 2a can be started such that the regeneration can be completed during the acceleration phase.

If the distance between the motor vehicle and the vehicle ahead is less than the target value, the distance to the vehicle ahead may be increased. To increase the distance to the vehicle ahead, the speed of the motor vehicle is reduced. The speed reduction may take place automatically (e.g., the adaptive cruise control system may automatically control the speed of the vehicle) or may be caused by the driver of the motor vehicle, whose attention is drawn by a display to the fact that the speed of the motor vehicle is to be reduced.

If the distance to the vehicle ahead is greater than the target value of the distance and/or the speed is less than the set speed, an acceleration phase is started in at the same time as regeneration of the NOx storage catalytic converter is started. If the distance already corresponds to or exceeds the target value, the process of reducing the vehicle speed to increase the distance may be dispensed with. The acceleration phase is maintained until a target value of the speed is reached.

Figure 2:
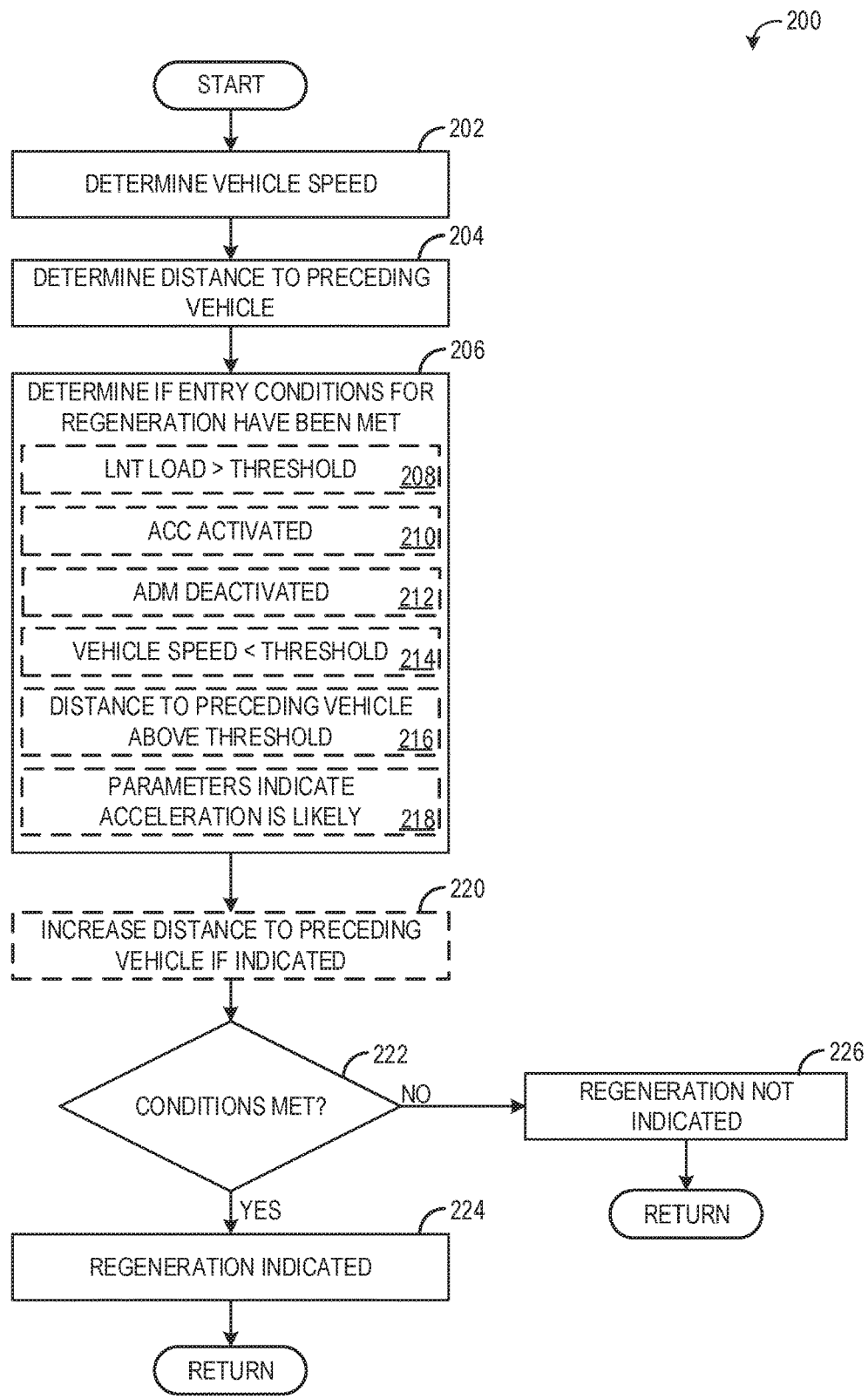
FIGS. 2 and 3 show flow charts of methods for operating the engine system of FIG. 1.

Turning now to FIG. 2, a method 200 for operating an engine system, such as the engine system of FIG. 1, is presented. Instructions for carrying out method 200 and the rest of the methods included herein may be executed by a controller, such as control device 13 and/or adaptive cruise control system 14, based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, method 200 includes determining vehicle speed. The vehicle speed may be determined by a suitable vehicle speed sensor. At 204, method 200 includes determining a distance to a preceding vehicle, which may be determined based on a radar sensor or other sensor. At 206, method 200 includes determining if entry conditions for performing a lean NOx trap regeneration have been met. The entry conditions for regeneration the LNT may include any one or more of the following conditions.

The first entry condition includes the load on the LNT being above a threshold load, as indicated at 208. The LNT load may be determined based on output from a NOx sensor at the LNT, e.g., indicating that NOx stored in the LNT is above a threshold level. Additionally or alternatively, the LNT load may be determined based on NOx levels downstream of the LNT as detected by a downstream NOx sensor. For example, if NOx is detected by the downstream NOx sensor, it may indicate NOx breakthrough from the LNT is occurring, and thus the load on the LNT is above the threshold.

A second entry condition includes the adaptive cruise control (ACC) being activated, as indicated at 210. The ACC may be activated by an operator of the vehicle. In other examples, the ACC may be activated automatically, for example in response to the indication that the LNT load is above the threshold.

A third entry condition includes an automated driving mode (ADM) being disabled, as indicated at 212. In the ADM, the vehicle may automatically adjust speed and steering parameters to stay within a lane on the road and stay within a speed parameters (as determined by preset speed limits, preceding vehicle distance, and road conditions such as grade, curvature, etc.). Because the LNT regeneration includes a controlled acceleration, it may not be desirable to carry out the regeneration during autonomous driving mode, as an operator may not be fully aware that the acceleration is occurring and may not act to stop the acceleration if unsafe driving conditions arise.

A fourth entry condition includes vehicle speed being less than a threshold speed, as indicated at 214. The threshold speed may be a speed below a speed limit for the road on which the vehicle is driving, and may be a speed that is lower than a speed of the preceding vehicle. In this way, during the controlled acceleration, an increase in vehicle speed may occur without coming too close to the preceding vehicle and without exceeding any speed limits.

A fifth entry condition may include the distance to the preceding vehicle being above a threshold distance, as indicated at 216. The threshold distance may be equal to or greater than a preset minimum distance for the preceding vehicle, and may be adjusted based on the LNT load and corresponding expected duration of the regeneration phase. For example, as the LNT load increases, the distance may increase.

A sixth entry condition may include additional parameters indicating that vehicle acceleration is likely, as indicated at 218. The additional parameters may include GPS or other navigation data indicating that an increase in the speed limit, change in road grade, or other parameter is upcoming, signaling a likelihood that the vehicle will accelerate. The parameters may further include past driving behavior for the operator, preceding vehicle speed, brake status of the preceding vehicle, and vehicle operational data (e.g., speed, load).

At 220, method 200 optionally includes increasing the distance to the preceding vehicle if indicated. For example, if the distance is not greater than the threshold, the distance may be increased by reducing the speed of the motor vehicle.

At 222, method 200 includes determining if the conditions for regenerating the LNT have been met. As mentioned previously, any one or more of the entry conditions may be met prior to initiating regeneration. In one example, regeneration may be carried out only when at least the LNT load is above the threshold, the ACC is activated, vehicle speed is below the threshold, and the distance is above the threshold.

If the entry conditions have been met, method 200 proceeds to 224 to indicate a regeneration is to be performed. If the entry conditions have not been met, method 200 proceeds to 226 to indicate that regeneration is not to be performed. Method 200 then returns.

Figure 3:
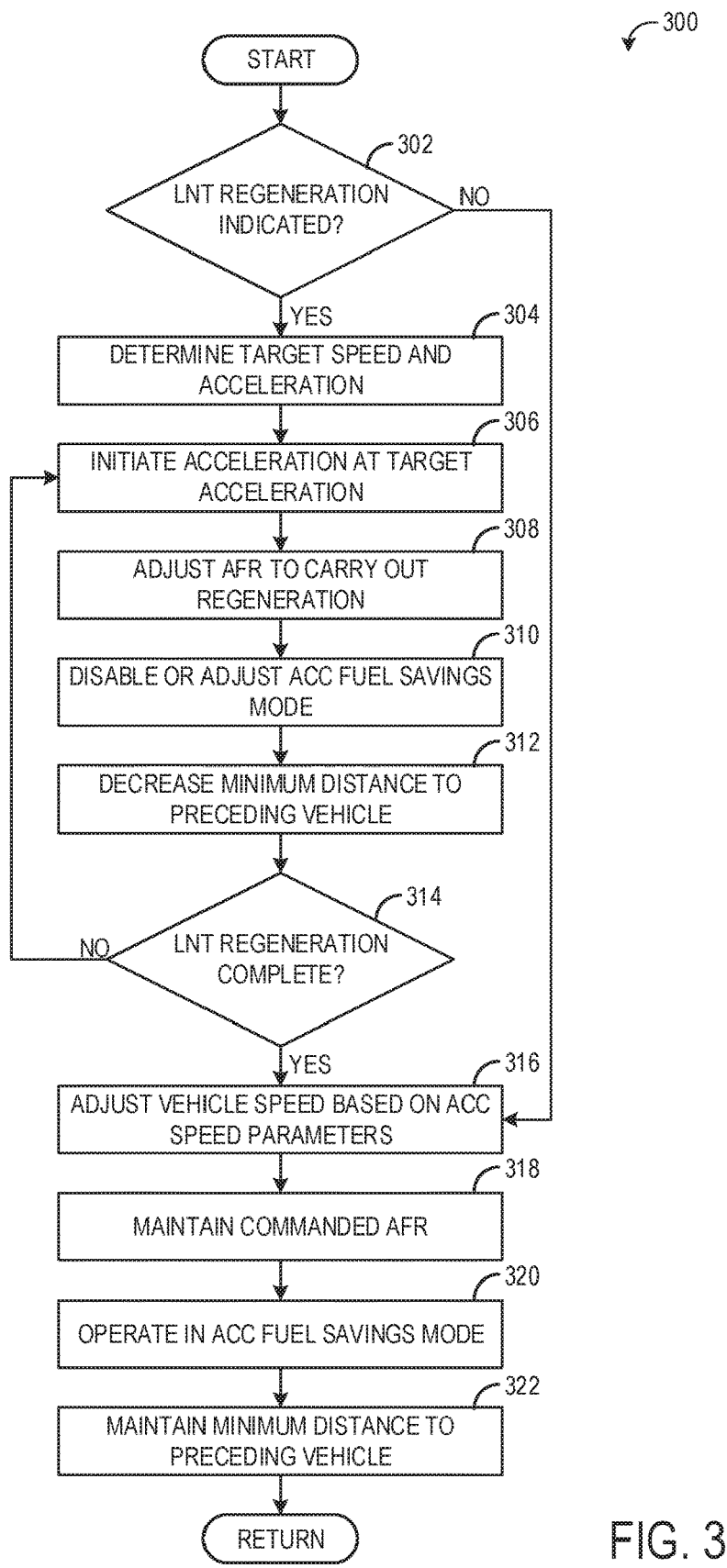

FIG. 3 is a flow chart illustrating a method 300 for performing an LNT regeneration using adaptive cruise control. At 302, method 300 includes determining if LNT regeneration is indicated. If LNT regeneration is not indicated, method 300 proceeds to 316, which will be explained in more detail below. If LNT regeneration is indicated, method 300 proceeds to 304 to determine a target vehicle speed and associated target acceleration. The target speed may be the upper limit speed set by the operator or ACC system. The target acceleration may be determined as a function of the target speed, distance to the preceding vehicle, and desired AFR during regeneration, for example.

At 306, method 300 initiates the acceleration at the determined target acceleration. At 308, method 300 adjusts the engine air-fuel ratio (AFR) to carry out the regeneration. The AFR may be adjusted to meet the demanded torque during the acceleration, and further to meet the commanded AFR for performing the rich purge of the regeneration. In one example, the AFR may be adjusted to be rich (e.g., more fuel) relative to operation of the engine without performing the regeneration.

At 310, method 300 may include disabling or adjusting an ACC fuel savings mode. The ACC fuel savings mode may automatically adjust acceleration, vehicle speed, and vehicle gear during operation in adaptive cruise control to optimize fuel consumption while maintaining vehicle speed and distance to the preceding vehicle within limits. For example, the fuel savings mode may adjust the transmission to operate the vehicle in neutral gear for a duration, allowing the vehicle to coast, until a lower threshold speed is reached, wherein the transmission may be shifted to a driven gear to accelerate above the lower threshold speed. While such actions may lower fuel consumption, the fuel savings mode may interrupt the LNT regeneration if, for example, a shift to neutral gear is indicated to save fuel. Thus, it may be desirable to disable the fuel savings mode during LNT regeneration. In other examples, the fuel savings mode may be adjusting by extending a certain acceleration event in the fuel savings mode (e.g., delaying a neutral gear shift).

At 312, method 300 may include decreasing a minimum distance to the preceding vehicle. During standard ACC operation, the vehicle speed may be adjusted to maintain a predetermined minimum distance between the motor vehicle and preceding vehicle. However, during LNT regeneration, this minimum distance may be decreased to allow regeneration to reach completion. While the minimum distance may be decreased, it is to be understood that an absolute minimum distance may still be adhered to, in order to avoid operation at an undesirably close distance to the preceding vehicle.

At 314, method 300 includes determining if the LNT regeneration is complete. The determination may be based on sensor data (e.g., LNT NOx sensor data indicating that the NOx from the LNT has been purged) or may be based on a calculated duration of the regeneration. If the regeneration is not complete, method 300 proceeds to 306 to continue to operate with the target acceleration.

If the regeneration is complete, method 300 proceeds to 316 to adjust the vehicle speed based on the ACC speed parameters. For example, the vehicle speed may be increased or decreased in order to maintain vehicle speed around the target speed. At 318, method 300 includes maintaining commanded AFR. This may include ceasing operation in the rich purge mode, and operating at the AFR indicated for the current vehicle conditions (e.g., maintaining operation at stoichiometric AFR). At 320, method 300 includes operating in the ACC fuel savings mode. In this way, the ACC vehicle speed adjustment may be performed to decrease fuel consumption, and may include shifting to neutral gear for short durations in some examples. At 322, method 300 includes maintaining the minimum distance to the preceding vehicle. In this way, after the regeneration is complete, the ACC may resume standard vehicle speed control, including maintaining the predetermined minimum distance to the preceding vehicle, while optimizing fuel consumption with the fuel savings mode. Method 300 then returns.

The technical effect of performing LNT regeneration during a controlled acceleration with adaptive cruise control is the ability to perform an uninterrupted regeneration during conditions where fuel usage may already be increased, thus lowering the fuel penalty for carrying out the regeneration.

An embodiment of a method includes, responsive to an indication to regenerate a lean NOx trap, adjusting a fuel injection amount to increase a temperature of the lean NOx trap to a target temperature, the fuel injection amount further adjusted to reach a target vehicle acceleration. In an example, the target vehicle acceleration is determined based on a difference between a current vehicle speed and a target vehicle speed, a distance to a preceding vehicle, and a lean NOx trap load. For example, the controller may determine a control signal to send to the fuel injector actuator, such as a pulse width of the signal being determined based on a determination of the difference between a current vehicle speed and a target vehicle speed, a distance to a preceding vehicle, and a lean NOx trap load. The difference between a current vehicle speed and a target vehicle speed may be based on measured vehicle speed and a predetermined (as set by an operator or by the adaptive cruise control system) target speed. The distance to a preceding vehicle may be based on output from a vehicle sensor configured to determine a distance between the sensor and an object in front of the sensor, such as a radar sensor. The lean NOx trap load may be based on a measured NOx load on the sensor, or determined based on operating conditions such as time since a previous regeneration, air-fuel ratio, engine load, etc. The controller may determine the pulse width through a determination that directly takes into account the target acceleration as determined by the difference between a current vehicle speed and a target vehicle speed, the distance to a preceding vehicle, and the lean NOx trap load, such as increasing the pulse width with increasing target acceleration. The controller may alternatively determine the pulse width based on a calculation using a look-up table with the input being target acceleration and the output being pulse-width.

As another example, the controller may make a logical determination (e.g., regarding a duration that the injection nozzles are open) based on logic rules that are a function of the target acceleration. The controller may then generate a control signal that is sent to the injector nozzles.

In an example, the adjusting of the fuel injector amount is carried out further responsive to an adaptive cruise control system being activated. The method may further include, responsive to the indication to regenerate the lean NOx trap, disabling a fuel savings mode of the adaptive cruise control system. Disabling of the fuel savings mode may include carrying out a continuous, uninterrupted acceleration without shifting gears or allowing vehicle speed to temporarily decrease.

Another example of a method includes adjusting an amount of vehicle acceleration based on a difference between a current vehicle speed and a target vehicle speed, a distance to a preceding vehicle, and a lean NOx trap load; and adjusting a fuel injection amount based on the adjusted amount of vehicle acceleration and target lean NOx trap temperature. The target lean NOx trap temperature may be a function of a NOx load on the lean NOx trap, and adjusting a fuel injection amount may include increasing a fuel injection amount. During the increasing of the fuel injection amount, an adaptive cruise control system may be active and responsive to the increasing of the fuel injection amount, a fuel savings mode and an autonomous driving mode of the adaptive cruise control system may be disabled.

For example, the controller may determine a control signal to send to the fuel injector actuator, such as a pulse width of the signal being determined based on a determination of the difference between a current vehicle speed and a target vehicle speed, a distance to a preceding vehicle, and a lean NOx trap load. The difference between a current vehicle speed and a target vehicle speed may be based on measured vehicle speed and a predetermined (as set by an operator or by the adaptive cruise control system) target speed. The distance to a preceding vehicle may be based on output from a vehicle sensor configured to determine a distance between the sensor and an object in front of the sensor, such as a radar sensor. The lean NOx trap load may be based on a measured NOx load on the sensor, or determined based on operating conditions such as time since a previous regeneration, air-fuel ratio, engine load, etc. The controller may determine the pulse width through a determination that directly takes into account the difference between a current vehicle speed and a target vehicle speed, the distance to a preceding vehicle, and the lean NOx trap load, such as increasing the pulse width with increasing difference between a current vehicle speed and a target vehicle speed, the distance to a preceding vehicle, and/or the lean NOx trap load. The controller may alternatively determine the pulse width based on a calculation using a look-up table with the input being difference between a current vehicle speed and a target vehicle speed, the distance to a preceding vehicle, and/or the lean NOx trap load and the output being pulse-width.

As another example, the controller may make a logical determination (e.g., regarding a duration that the injection nozzles are open) based on logic rules that are a function of the difference between a current vehicle speed and a target vehicle speed, the distance to a preceding vehicle, and the lean NOx trap load. The controller may then generate a control signal that is sent to the injector nozzles.

Likewise, for adjusting a fuel injection amount based on the adjusted amount of vehicle acceleration and target lean NOx trap temperature, the controller may determine a control signal to send to the fuel injector actuator, such as a pulse width of the signal being determined based on the adjusted vehicle acceleration (described above) and a target lean NOx trap temperature. The target lean NOx trap temperature may be based on a measured NOx load on the sensor and measured current lean NOx trap temperature, or determined based on operating conditions such as time since a previous regeneration, air-fuel ratio, engine load, etc., as well as based on lean NOx trap configuration (e.g., material, size). The controller may determine the pulse width through a determination that directly takes into account the vehicle acceleration and lean NOx trap temperature. The controller may alternatively determine the pulse width based on a calculation using a look-up table with inputs being the vehicle acceleration amount and/or the target lean NOx trap temperature and the output being pulse-width.

As another example, the controller may make a logical determination (e.g., regarding a duration that the injection nozzles are open) based on logic rules that are a function of the vehicle acceleration amount and the target lean NOx trap temperature. The controller may then generate a control signal that is sent to the injector nozzles.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for the control of a NOx storage catalytic converter that is disposed in an exhaust system of an internal combustion engine of a motor vehicle with an adaptive cruise control system, comprising:
responsive to a first condition:

detecting a first speed of the motor vehicle;

activating the adaptive cruise control system and setting the adaptive cruise control system to a second speed and detecting a distance to a preceding vehicle;

increasing the distance to the preceding vehicle if the distance is less than a target distance by reducing the first speed of the motor vehicle;

starting an acceleration phase while simultaneously starting regeneration of the NOx storage catalytic converter by adjusting an amount of fuel injected to the engine of the motor vehicle if the distance to the preceding vehicle is greater than the target distance and the first speed of the motor vehicle is less than the second speed; and maintaining the acceleration phase until a target speed is reached, a gradient of an acceleration of the motor vehicle controlled such that the regeneration of the NOx storage catalytic converter is completed in the acceleration phase.

2. The method as claimed in claim 1, wherein the first condition comprises an oxides of nitrogen content of the NOx storage catalytic converter reaching a threshold value.

3. The method as claimed in claim 1, wherein the first condition comprises a temperature of the NOx storage catalytic converter above a first threshold value and below a second threshold value.

4. The method as claimed in claim 1, wherein the first condition comprises one or more current and/or averaged parameter values meeting respective conditions, wherein the parameters are selected from the group comprising a speed of the motor vehicle, a revolution rate of the internal combustion engine, a load, a type and amount of the fuel, an accelerator pedal position, and a brake signals.

5. The method as claimed in claim 4, wherein an increase in a temperature of the NOx storage catalytic converter is initiated depending on the current and/or averaged parameter values and on a probability based on a driver profile that the acceleration phase is started in a next predetermined time frame and that the acceleration phase lasts for a given time for the regeneration.

6. The method as claimed in claim 1, wherein the first condition comprises information from a navigation system indicating a pre-programmed route is to be travelled and/or current information about a route to be travelled.

7. The method as claimed in claim 1, wherein the first condition comprises a speed difference between the motor vehicle and the preceding vehicle being equal to a threshold difference.

8. The method as claimed in claim 1, wherein the acceleration phase is additionally controlled depending on information about oncoming vehicles.

9. The method as claimed in claim 1, wherein the acceleration phase is controlled based on car-to-car communications relating to upcoming acceleration or braking events of the preceding vehicle.

10. The method as claimed in claim 1, wherein no gear change is made during the acceleration phase.

11. The method as claimed in claim 1, wherein fuel injection for the regeneration is adjusted depending on a calculated period of time for carrying out the regeneration.

12. A method, comprising:
responsive to an indication to regenerate a lean NOx trap, adjusting a fuel injection amount to increase a temperature of the lean NOx trap to a target temperature, and delivering fuel to an engine according thereto, the fuel injection amount further adjusted to reach a target vehicle acceleration, the target vehicle acceleration based on a vehicle speed difference, a distance to a preceding vehicle, and a lean NOx trap load.

13. The method of claim 12, wherein the vehicle speed difference is between a current and a target vehicle speed.

14. The method of claim 12, wherein the adjusting of the fuel injection amount is carried out further responsive to an adaptive cruise control system being activated.

15. The method of claim 14, further comprising, responsive to the indication to regenerate the lean NOx trap, disabling a fuel savings mode of the adaptive cruise control system.

16. A method comprising:
adjusting an amount of vehicle acceleration based on a difference between a current vehicle speed and a target vehicle speed, a distance to a preceding vehicle, and a lean NOx trap load;

adjusting a fuel injection amount based on the adjusted amount of vehicle acceleration and a target lean NOx trap temperature; and delivering fuel to an engine according to the adjusted fuel injection amount.

17. The method of claim 16, wherein the target lean NOx trap temperature is a function of the lean NOx trap load, and wherein adjusting the fuel injection amount includes increasing the fuel injection amount.

18. The method of claim 17, wherein, during the increasing of the fuel injection amount, an adaptive cruise control system is active and, responsive to the increasing of the fuel injection amount, a fuel savings mode and an autonomous driving mode of the adaptive cruise control system are disabled.

* * * * *